United States Patent
Peters et al.

(10) Patent No.: US 9,480,906 B1
(45) Date of Patent: Nov. 1, 2016

(54) WATER RACEWAY

(71) Applicants: William H. Peters, Bryan, OH (US);
 Kevin H. Peters, West Unity, OH (US)

(72) Inventors: William H. Peters, Bryan, OH (US);
 Kevin H. Peters, West Unity, OH (US)

( * ) Notice: Subject to any disclaimer, the term of this patent is extended or adjusted under 35 U.S.C. 154(b) by 0 days.

(21) Appl. No.: 14/998,587

(22) Filed: Jan. 21, 2016

Related U.S. Application Data

(60) Provisional application No. 62/175,775, filed on Jun. 15, 2015.

(51) Int. Cl.
  *A63F 9/14* (2006.01)
  *G09B 23/12* (2006.01)

(52) U.S. Cl.
  CPC .............. *A63F 9/14* (2013.01); *G09B 23/12* (2013.01)

(58) Field of Classification Search
  CPC ........ A63F 9/14; A63H 18/00; A63H 23/00; A63H 23/10; A63H 33/0087; G09B 23/12; A47K 3/10; A47K 3/001
  See application file for complete search history.

(56) References Cited

U.S. PATENT DOCUMENTS

| | | | | |
|---|---|---|---|---|
| 1,368,671 A | * | 2/1921 | Watson | A63F 9/14 104/73 |
| 1,369,887 A | * | 3/1921 | Demetropoulos | A63F 9/14 463/69 |
| 1,389,611 A | * | 9/1921 | Wood | A63F 9/14 463/64 |
| 1,475,154 A | * | 11/1923 | Foans | A63F 9/14 463/68 |
| 1,499,875 A | * | 7/1924 | Rosenheim | A63F 9/14 463/64 |
| 1,726,444 A | * | 8/1929 | McBride | A63F 9/14 463/68 |
| 2,863,666 A | * | 12/1958 | Aronson | A63F 9/14 273/108 |
| 3,339,924 A | * | 9/1967 | Costagliola | A63F 9/14 446/178 |
| 3,447,258 A | * | 6/1969 | Moore | A63H 18/12 104/60 |
| 3,479,031 A | * | 11/1969 | Wood, Jr. | A63F 9/14 446/165 |
| 4,963,116 A | * | 10/1990 | Huber | A63F 9/14 446/153 |
| D344,104 S | * | 2/1994 | Yen | D21/564 |
| 5,640,911 A | * | 6/1997 | Peters | A47D 3/00 108/26 |
| 5,651,736 A | * | 7/1997 | Myers | A63F 9/14 463/59 |
| 8,267,738 B2 | * | 9/2012 | Nuttall | A63H 18/06 446/153 |
| 2013/0324003 A1 | * | 12/2013 | Hippely | A63H 18/02 446/153 |

\* cited by examiner

Primary Examiner — Steven Wong
(74) Attorney, Agent, or Firm — David C. Purdue

(57) ABSTRACT

Provided is a water raceway device comprising a tub and a raceway insert. The tub is adapted to contain water to a functional depth, is open at the top, and is bounded by a set of side walls and a set of end walls. The raceway insert has a pair of dividers each having a first end, and a base. The base is engaged with the first ends of the dividers, has supports adapted for supporting the base on the tub, has a pair of slots elongated to define a forward direction and a rearward direction, each slot having slidably engaged therewith a handle, the handle having a paddle pivotably mounted thereon, and wherein each paddle can be moved in the forward direction or in the rearward direction. The dividers and the side walls define within the tub, wave sluices and a current sluice.

5 Claims, 6 Drawing Sheets

WATER RACEWAY

I. BACKGROUND

A. Technical Field

The present subject matter is directed to items that are usable to help educate children in learning activities. More specifically, the present subject matter is directed to the field of educational devices for teaching people about wave action and the dynamics of liquids.

B. Description of Related Art

Duck races are a popular pastime. It is not uncommon to see hundreds or thousands of people converge on a river to put ducks, which are almost universally yellow, into a river to see whose duck reaches the finish line first. Often, there is an entry fee and the proceeds may go to the winner or be given to a charity. It is fun for all, but the outcome is determined solely by luck.

It is an object of the present subject matter to provide a water raceway device designed for racing ducks or other floating objects, where skill is a factor in the outcome of the race.

It is a further object of the present subject matter to provide a water raceway device where the floating objects are conveyed down a first sluice primarily by the action of waves and are conveyed down a second sluice primarily under the force of currents.

It is a further object of the present subject matter to provide an insert that can be positioned in a tub to convert the tub into a device for racing floating objects.

It is a further object of the present subject matter to provide an educational experience that is so much fun that participants may not realize that they are learning about fluid dynamics and currents and waves.

It remains desirable to provide improvements in water raceway devices

II. SUMMARY

Provided is a water raceway device comprising a tub and a raceway insert. The tub is adapted to contain water to a functional depth, is open at the top, and is bounded by a set of side walls and a set of end walls. The raceway insert has a pair of dividers, each having a first end, and a base. The base is engaged with the first ends of the dividers, has supports adapted for supporting the base on the tub, has a pair of slots elongated to define a forward direction and a rearward direction, each slot having slidably engaged therewith a handle, the handle having a paddle pivotably mounted thereon, and wherein each paddle can be moved in the forward direction or in the rearward direction. The dividers and the side walls define within the tub, wave sluices and a current sluice.

III. BRIEF DESCRIPTION OF THE DRAWINGS

IV. DETAILED DESCRIPTION

Figure 1:
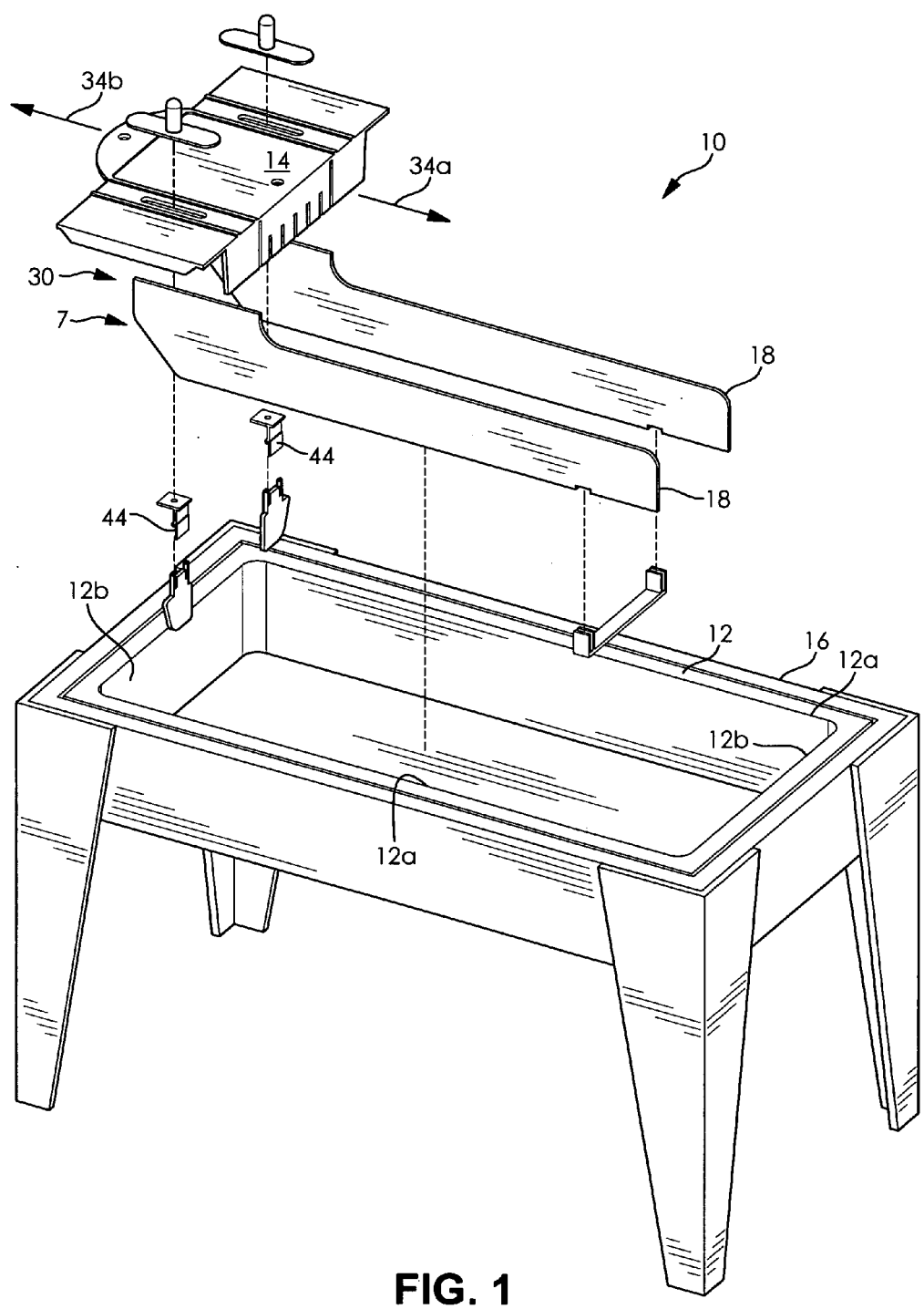
FIG. 1 is an exploded view of one embodiment of a water raceway device.
Figure 2:
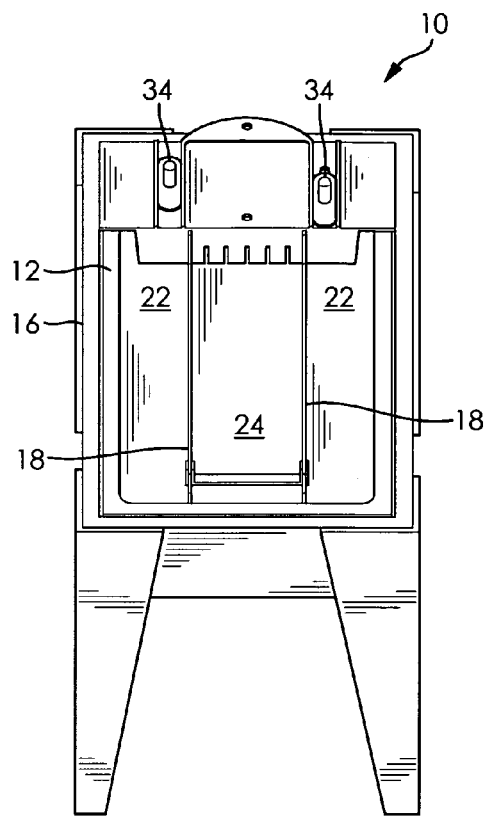
FIG. 2 is an elevated perspective view of one embodiment of a water raceway device.
Figure 3:
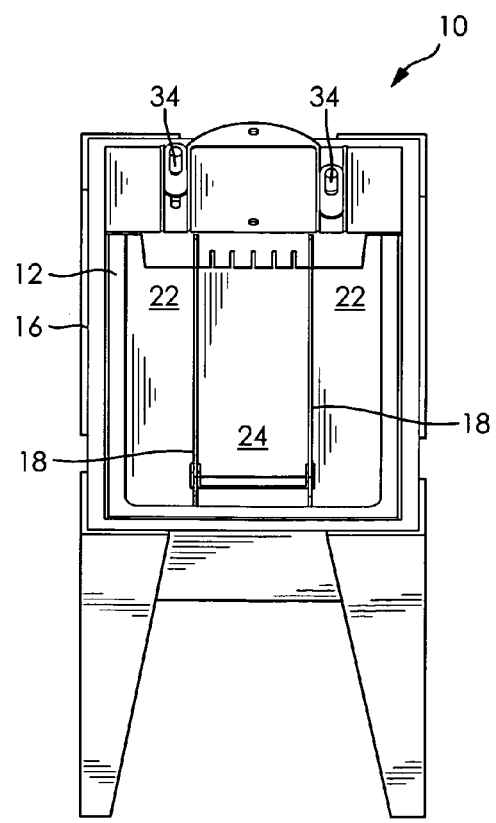
FIG. 3 is an elevated perspective view of one embodiment of a water raceway device.
Figure 4:
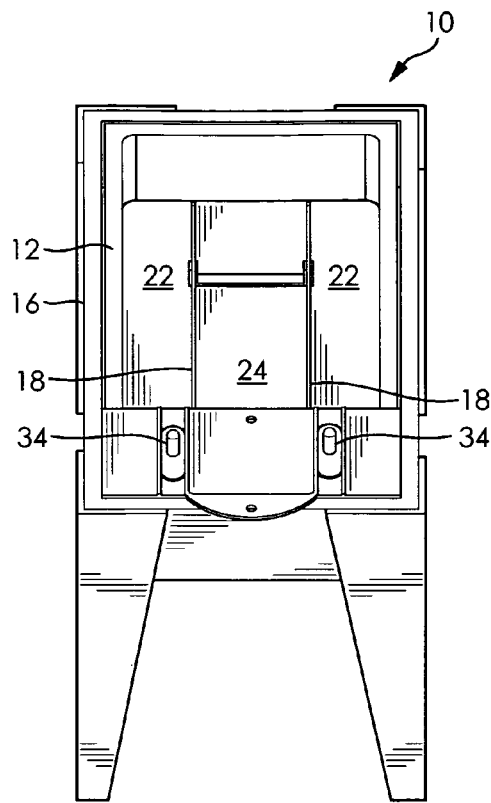
FIG. 4 is an elevated perspective view of one embodiment of a water raceway device.

Referring now to FIGS. 1-11, provided is one non-limiting embodiment of a water raceway device 10.

In the non-limiting embodiment shown in FIGS. 1-11, a water raceway device 10 may comprise a tub 12 and a raceway insert 14.

A tub 12 may comprise any vessel which is adapted to accommodate the water raceway device 10 as described herein, which is adapted contain water to a functional depth. In some embodiments, the tub 12 may be substantially rectangular being defined by two pairs of upstanding walls, a pair of side walls 12a substantially parallel to one another and a pair of end walls 12b substantially parallel to one another. As shown in FIGS. 1-4, the tub walls may have some filleting, or draft angles, or both.

In one embodiment, the tub 12 may be a CHILDBRITE™ brand sand and water table as manufactured by MANTA RAY™. The tub 12 may be supported on a four-legged stand 16. A sand and water table is disclosed in U.S. Pat. No. 5,640,911.

The raceway insert 14 may comprise two or more dividers 18 which are supported in the tub 12. In the non-limiting embodiment shown, the dividers 18 are substantially parallel to one another and are generally parallel to the side walls 12a of the tub 12. In other embodiments the dividers 18 may be angled with respect to one another, or angled with respect to the side walls 12a, or both. First ends 20 of the dividers 18 may be spaced from a first end wall 12b of the tub 12. A first divider 18a and a first side wall 12a of the tub define a first wave sluice 22, and the other divider 18b and the second side wall 12a, opposite the first side wall, define a second wave sluice 22. Between the wave sluices 22, there is a current sluice 24 that is defined by the divider 18. The wave sluices 22 are in fluid communication with the current sluice 24 adjacent to the first ends 20 of the dividers 18 at least through the end region 9 defined between the end wall 12b proximate to and offset from the first ends 20 of the dividers 18.

Figure 5:
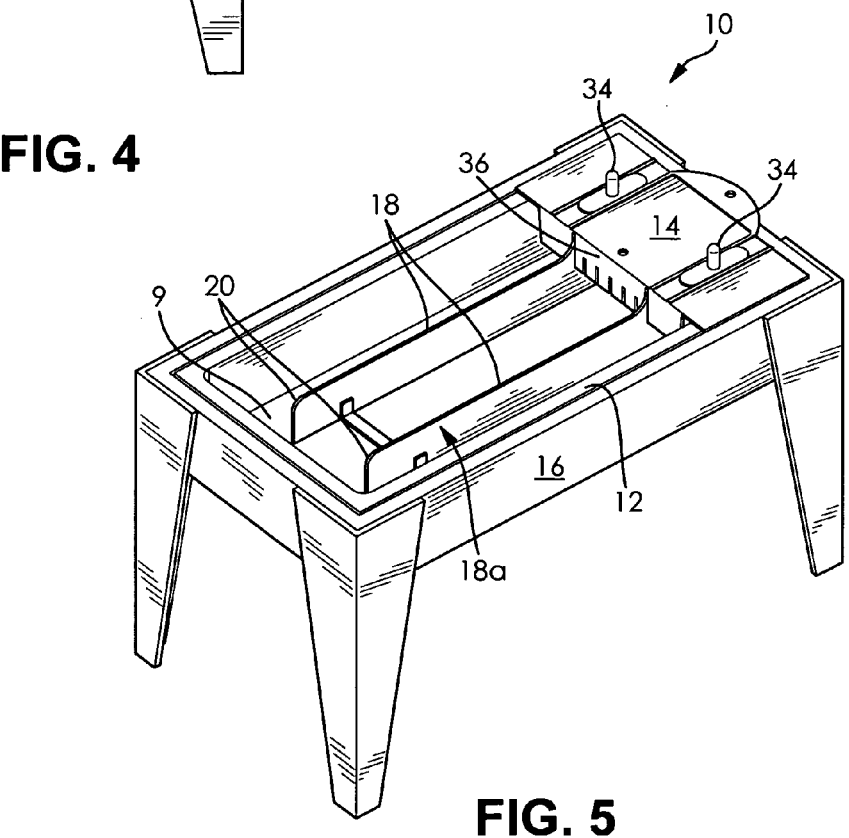
FIG. 5 is a perspective view of one embodiment of a water raceway device
Figure 6:
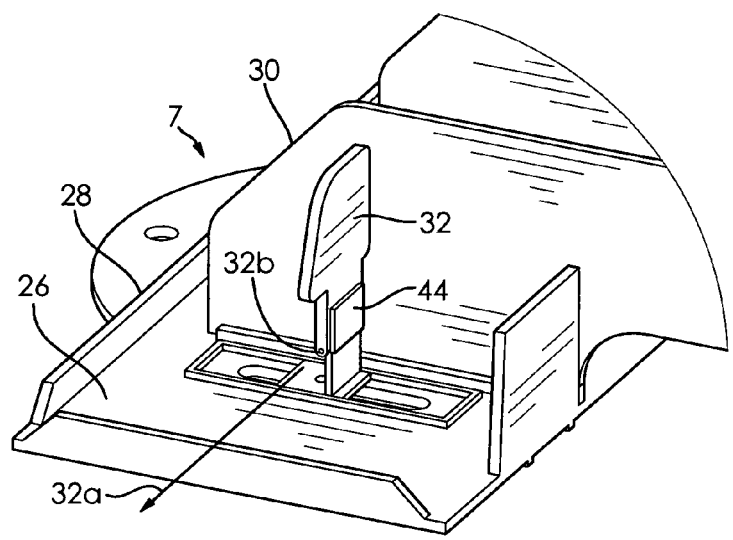
FIG. 6 is a close up perspective view of one embodiment of a base.
Figure 7:
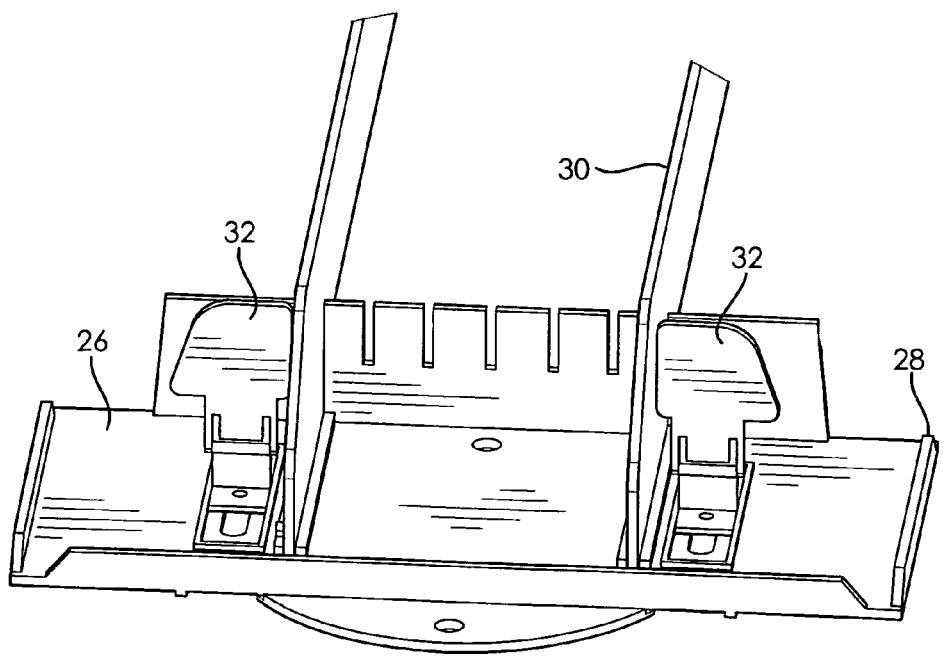
FIG. 7 is a close up perspective view of one embodiment of a base.

Referring now to FIGS. 5 through 7, some further details of the raceway insert 14 are shown. The raceway insert 14 comprises a base 26 with supports 28 for supporting the base 26 on the tub 12 and/or on the stand 16. The dividers 18 may be supported on the base 26 and they extend forward or, when the insert 14 is supported on the tub 12 and/or the stand 16, the dividers 18 extend from the base 26 towards what has been called, above, the first end wall 12b of the tub. As noted above, the length of the dividers 18 is controlled so that, when the insert is positioned in the tub 12, the first ends 20 of the dividers 18 do not reach the first end wall 12b of the tub 12, but rather leave the end region 9 open for fluid communication. The dividers 18 have a second end 30 and, when the insert 14 is in the tub 12, the second ends 30 of the dividers 18 are adjacent to a second tub end wall which is opposite the first end wall 12b of the tub 12. However, there is a passageway 7 between the second ends 30 of the dividers 18, and the second tub end wall 12b so that there is communication between the wave sluices 22 and the current sluice 24 adjacent to the second ends 30 of the dividers 18.

Figure 9:
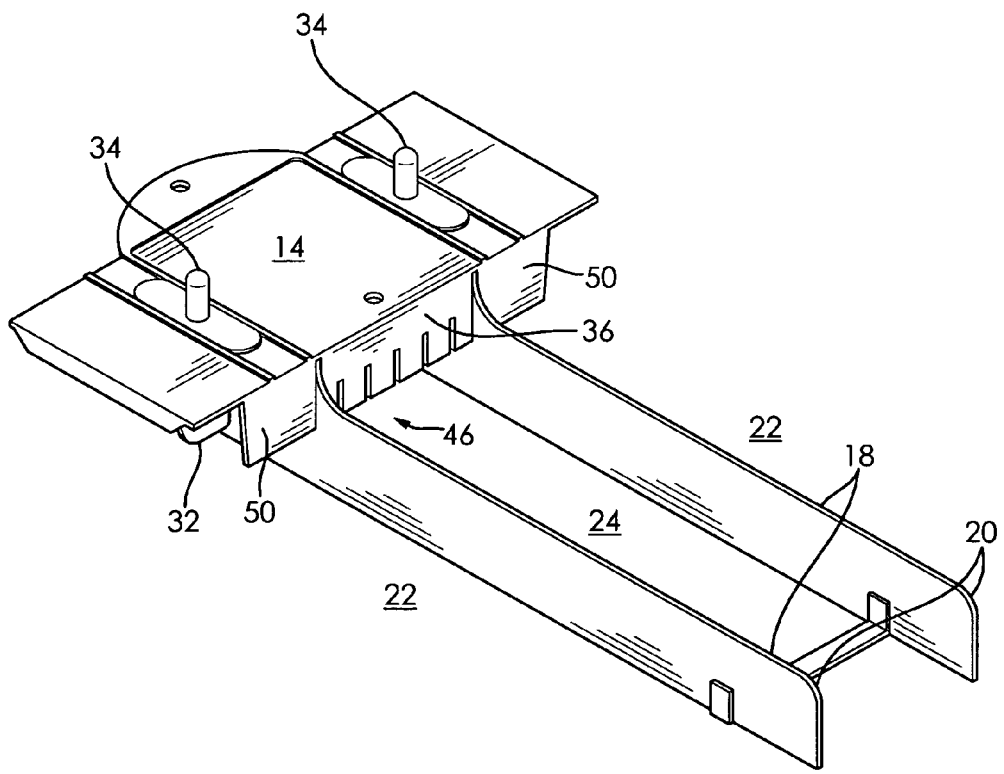
FIG. 9 is a perspective view of one embodiment of a raceway insert.
Figure 10:
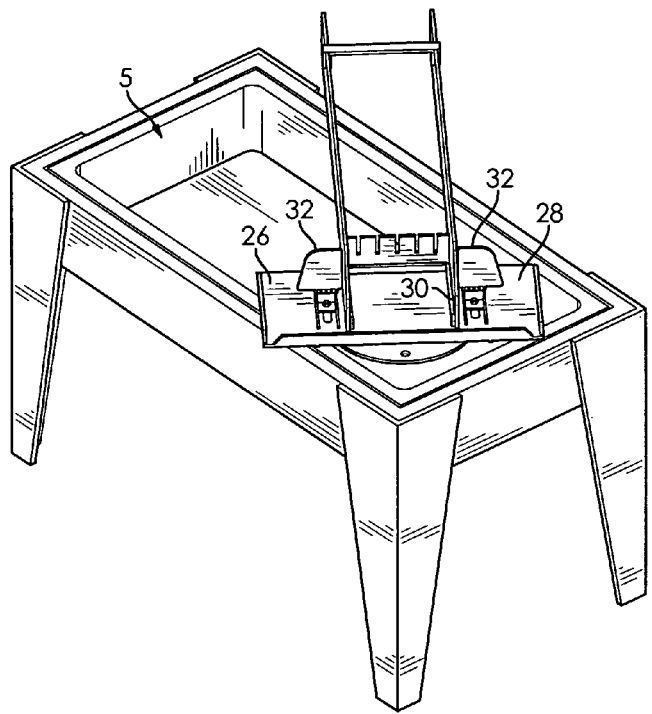
FIG. 10 is a perspective view of one embodiment of a water raceway insert.
Figure 11:
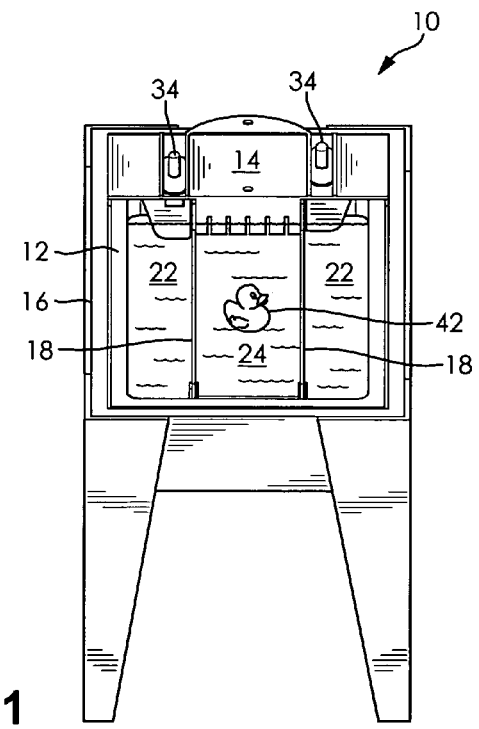
FIG. 11 is a perspective view of one embodiment of a water raceway device.

In some embodiments, the paddles 32 are supported on the base 26 for pivotal movement between a down position, as shown in FIG. 9, and a raised position, in which the paddle 32 is rotated about the axis 32a as defined by hinge 32b upwardly from the down position. In FIG. 10, the paddle 32 on the right side is in the down position and the paddle 32 on the left is in the raised position. The paddles 32 are supported on the base 26 so that, at least when in the down position, they will extend into the wave sluices 22 when the insert 14 is in the tub 12. When the paddles 32 are in the down position, the ends of the paddles 32 extend downwardly into the wave sluices 22 and into water in the wave sluices 22.

The paddles 32 are slidably mounted on the base 26. Handles 34 are mounted on the base 26 for sliding movement in a first direction 34a, towards the first tub end wall 12b, and in a second direction 34b, towards the second tub end wall 12b. Movement of the handles 34 towards the first tub end wall 12b will be called forward handle movement, and movement towards the second tub end wall 12b will be called backward movement. The handles 34 are generally above the base 26 and the paddles 32 are generally below the base 26. The handles 34 are connected to the paddles 32 so that forward movement of the handles 34 causes forward movement of the paddles 32, and backward movement of the handles 34 causes backward movement of the paddles 32.

In some embodiments, the paddles 32 may be mounted by a hinge 32b or a pin or shaft or other component to permit it to pivot about an axis 32a. In some embodiments, when the paddles are in the down position, rearward pivoting of the paddles 32 is prevented. In some embodiments, when the paddles 32 are in the down position, forward pivoting of the paddles 32 is permitted. As shown in FIG. 6, a plate 44 or other motion restricting component may be engaged or engageable with the paddle 32 to restrict the pivotable motion of the paddle 32.

In one non-limiting embodiment of the water raceway 10, one method of operation is as follows. Floating objects 42 are positioned in the wave sluices 22, adjacent to the paddles 32, with the handles 34 and the paddles 32 in the rearward position. Then, a race can begin. The paddles 32 are in the down position and the first ends 32c of the paddles 32 are in the water in the wave sluices 22. The handles 34 and the paddles 32 may be moved forward and the movement of the paddles 32 generates forward moving waves in the wave sluices 22. This causes the floating objects 42 to move forward in the wave sluices 22. The level of the water in front of the paddles 32 rises and the level of water behind the paddles 32 lowers. The lower level of the water behind the paddles 32 causes make-up water to move rearwardly in the current sluice 24 and, thus, a rearward current is established in the current sluice 24. The make-up water travels around the second ends 30 of the dividers 18 and into the wave sluices 22, behind the paddles 32. Then, the handles 34 and the paddles 32 are moved rearwardly. As the paddles 32 move rearwardly, the pivoting paddles 32 pivot forward to minimize rearward movement of water in the wave sluices 22. When the handles 34 and the paddles 32 reach the rearward position, the paddles 32 pivot downwardly so that the ends 32c of the paddles 32 extend into the water again. Forward movement of the handles 34 and the paddles 32 generates another forward moving wave in the wave sluices 22 and this causes the floating-objects 42 to move forward in the wave sluices 22. When the waves reach the first tub end wall 12b, they stop being waves. However, the water level in the wave sluices 22 is higher than the water level in the current sluice 24 so water enters the current sluice 24 and moves rearwardly towards the second ends 30 of the dividers 18. This make-up water flows between the second ends 30 of the dividers 18 and the second tub end wall 12b, and into the wave sluices 22 behind the paddles 32. This cycle continues as the handles 34 and the paddles 32 are moved repeatedly rearwardly and forwardly.

When the floating objects 42 reach the first ends 20 of the dividers 18, they are subject to the rearward current in the current sluice 24, which draws the floating objects 42 into the current sluice 24 where the rearward moving current causes the floating objects 42 to begin moving rearwardly in the current sluice 24, towards the finish line 46 or region. A pervious fluid baffle 36, as shown in FIG. 5, may be provided at the rear of the current sluice 24 to demarcate the finish line 46 or region. The baffle may also serve to prevent floating objects from moving under the base 26 of the raceway insert 14.

The forward and rearward movement timing of the handles 34 and the paddles 32 determine the amplitude and frequency of the waves that are generated. Wave properties will be influenced by many factors including, but not necessarily limited to, the depth of water in the tub 12, the size and shape of the paddles 32 and the size and shape of the wave sluices 22, and the speed at which the handles 34 and the paddles 32 are moved forwardly and rearwardly. For a given floating object 42, the force of the waves can be maximized by controlling the timing and speed of the movement of the handles 34 and the paddles 32. By control of these factors, the speed of the floating objects 42 can be maximized. Thus, victory can be achieved through the development and use of skill in moving the handles 34 and the paddles 32 forward and rearward in a way such that wave force is maximized.

It will be appreciated that the present subject matter provides a unique and novel water raceway 10 and water raceway insert 14 which is designed to be educational, and fun!

In some embodiments the tub 12 and the stand 16 may be parts of a CHILDBRITE™ brand sand and water table as manufactured by MANTA RAY™ having an inside dimension of approximately 42 inches in length, 17.5 inches in width, and 5 inches deep. In one such an embodiment, the first 11 inches of the tub 12 may be enclosed within the base 26 of the raceway insert 14 with two vertical dividers 18 creating lanes of water at rest. The dividers 18 may stop short of the first end wall 12b by about 4 inches creating an end region 9 of about 4 inches in length. The dividers 18 may stop short of the second end wall 12b by about 2 inches, leaving the water a 2 inch long fluid communication region through which to have natural movement when disturbed. This provides a set of two wave sluices 22, wherein each wave sluices 22 has a paddle 32 adapted for wave generation. Each of the paddles 32 is attached to a handle 34 through a substantially horizontal slot/opening in the base 26 which is adapted to allow movement of the handle 34 and paddle 32 of a pre-determined maximum length in the slot 48 to the side of the container. As shown in the non-limiting drawing FIGS. 1-11, each slot 48 may be parallel to the vertical dividers 18 such that each slot is elongated to define a forward direction and a rearward direction. When handle 34 is moved in a forward direction, the attached paddle 32 moves in conjunction with the handle 34 and pushes a wave of water ahead of it and also creates a low pressure region behind the paddle 34 which pulls in water behind the paddle 32. When moved rearwardly, the paddle 32 pivots to reduce, minimize or eliminate fluid agitation effects and, when stopped, pivots back to the vertical position ready to move forward and thereby create the next wave.

Each paddle 32 is adapted to performs two functions: a) when it is moved forward the paddle 32 is adapted to push water ahead of the paddle 32 generating a wave; b) when it is moved forward the paddle 32 is adapted to pull water in behind it creating a current, or movement, from the current sluice 24, around the end of the vertical dividers 18, and into the base 26. If this action is repeated, a flow pattern may be developed wherein water circulates around the vertical partitions 18, first as wave along the wave sluice 22 to the far end or the vertical divider 18 where the water curves around the end 20 of the vertical divider 18, and returns to the base 26 in as a current flow in current sluice 24 due to the pulling effect when the paddle 32 moves forward.

When both paddles 32 are performing the same effect, counter rotating movements of water will be established within the same tub 12. By introducing floating objects 42 being moved by the waves or current being generated by the movement of the paddle 32, through the action of two associated users, a race may be conducted.

Figure 8:
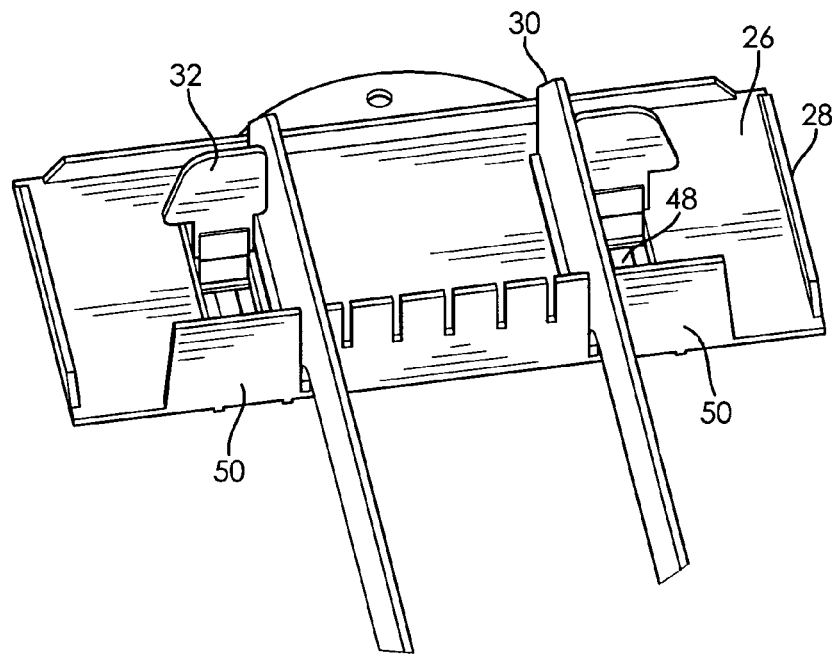
FIG. 8 is a close up perspective view of one embodiment of a base.

In some embodiments, baffles 50 are provided as shown in FIGS. 8 and 9. The baffles 50 extend from the base 14 towards and into the current sluices 24. In case a racer is particularly aggressive in operating the handles 34, the baffles 50 may serve to restrict or prevent water from slopping out of the tub 12 and onto the floor.

While the water raceway 10 and an associated method of use have been described above in connection with an illustrative embodiment, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the water raceway device 10 and associated method of use should not be limited to any single embodiment, but rather construed in breadth and scope in accordance with the recitations of the appended claims. The right to claim elements and/or sub-combinations that are disclosed herein as other inventions in other patent documents is hereby unconditionally reserved.

What is claimed is:

1. A water raceway device comprising
a tub being adapted to contain water to a functional depth, the tub being open at the top and bounded by
a set of side walls having
a first side wall, and
a second side wall,
a set of end walls having
a first side wall, and
a second side wall;
a raceway insert having
a pair of dividers, wherein each divider
has a first end and a second end, and
is parallel to the first side wall,
a base
engaged with the first ends of the dividers,
having supports adapted for supporting the base on the tub,
having a pair of slots elongated to define a forward direction and a rearward direction, each slot having slidably engaged therewith a handle,
the handle having a paddle pivotably mounted thereon;
wherein each paddle can be moved in the forward direction or in the rearward direction; and
wherein the dividers and the side walls define within the tub
a first wave sluice,
a second wave sluice, and
a current sluice.

2. The water raceway device of claim 1, further comprising a stand for supporting the tub.

3. The water raceway of claim 2, further comprising legs for supporting the stand.

4. The water raceway device of claim 2, wherein the stand is adapted to engage with and support the tub.

5. A method for conducting a race comprising:
providing a water raceway device having
a tub being adapted to contain water to a functional depth, the tub being open at the top and bounded by
a set of side walls having
a first side wall, and
a second side wall,
a set of end walls having
a first aide wall, and
a second side wall,
a raceway insert having
a pair of dividers, wherein each divider
has a first end and a second end, and
is parallel to the first side wall,
a base
engaged with the first ends of the dividers,
having supports adapted for supporting the base on the tub, and
having a pair of slots elongated to define a forward direction and a rearward direction, each slot having slidably engaged therewith a handle, the handle having a paddle pivotably mounted thereon;
wherein each paddle can be moved in the forward direction or in the rearward direction; and
wherein the dividers and the side walls define within the tub
a first wave sluice,
a second wave sluice, and
a current sluice;
adding water to the tub sufficient to establish therein a functional depth of water;
introducing into the water in each wave sluice, a floating object; and
operating the handles to move each floating object from its respective wave sluice to the current sluice.

* * * * *